US012668667B2

(12) United States Patent (10) Patent No.: US 12,668,667 B2
Stanjek et al. (45) Date of Patent: Jun. 30, 2026

(54) METHOD FOR PRODUCING ALKYL SILICONE RESINS

(71) Applicant: Wacker Chemie AG, Munich (DE)

(72) Inventors: Volker Stanjek, Ampfing (DE);
Dominik Jantke, Burghausen (DE);
Georg Lössel, Emmerting (DE)

(73) Assignee: Wacker Chemie AG, Munich (DE)

( * ) Notice: Subject to any disclaimer, the term of this patent is extended or adjusted under 35 U.S.C. 154(b) by 694 days.

(21) Appl. No.: 18/027,130

(22) PCT Filed: Oct. 6, 2020

(86) PCT No.: PCT/EP2020/077992
§ 371 (c)(1),
(2) Date: Mar. 20, 2023

(87) PCT Pub. No.: WO2022/073587
PCT Pub. Date: Apr. 14, 2022

(65) Prior Publication Data
US 2023/0331921 A1     Oct. 19, 2023

(51) Int. Cl.
C08G 77/08     (2006.01)
C08G 77/18     (2006.01)
C08G 77/32     (2006.01)
C08L 83/06     (2006.01)

(52) U.S. Cl.
CPC ............. C08G 77/18 (2013.01); C08G 77/32 (2013.01); C08L 83/06 (2013.01)

(58) Field of Classification Search
CPC ................................. C08G 77/08; C08G 77/06
See application file for complete search history.

(56) References Cited

U.S. PATENT DOCUMENTS 6,069,220 A  *  5/2000  Hoffmann ............. C08G 77/08
528/33

FOREIGN PATENT DOCUMENTS

| CN | 103145991 A | 6/2013 |
|---|---|---|
| EP | 1994080 B1 | 1/2019 |
| JP | 2004075970 A | 3/2004 |
| JP | 2004161876 A | 6/2004 |
| WO | 2008081890 A1 | 7/2008 |
| WO | 2019141377 A1 | 7/2019 |

OTHER PUBLICATIONS

H.R. Christen, Grundlagen der Allgemeinen und Anorganischen Chemie, 9th Edition 1988, section 10.3, pp. 363-371, ISBN 3793553949, Editor: Otto Salle, Frankfurt/Main (DE).

* cited by examiner

*Primary Examiner* — Margaret G Moore

(57) ABSTRACT

A process for producing alkyl silicone resins (A) containing at least 80 wt % of units of the general formula (I), $$R^1_a(R^2O)_b(HO)_dR^3_cSiO_{(4-a-b-c-d)/2},$$ (I)

is provided. Alkylalkoxysilane (A1) of the general formula (II), $$R^1_aR^3_cSi(OR^2)_{(4-a-c)},$$ (II)

is mixed in a first reaction step (R1), alternatively, with a pure acid (S) having $pK_a$ of not more than 5, with an at least 5 wt % aqueous solution of an acid (S) having a $pK_a$ of not more than 5 or with a halosilane compound (A2) of the general formula (III), $$R^1_aR^3_cSi(X)_{(4-a-c)}.$$ (III)

Subsequently, in at least one further reaction step, (R2) water is added.

15 Claims, No Drawings

METHOD FOR PRODUCING ALKYL SILICONE RESINS

CROSS-REFERENCE TO RELATED APPLICATION

This application is a U.S. National Phase Application of PCT/EP2020/077992, filed Oct. 6, 2020, the contents of which is hereby incorporated by reference in its entirety.

BACKGROUND

The invention relates to a process for producing alkyl silicone resins by acidic hydrolysis of alkylalkoxysilanes.

Organosilicon compounds have a long history of use in architectural preservation by virtue of their outstanding impregnating effect in the face of water and soiling, their environmental compatibility and their physiological safety.

The established impregnating compositions here comprise alkoxysilanes having a hydrophobic alkyl group, with alkyl groups having 8 carbon atoms, more particularly n-octyl groups or 1,4,4-trimethylpentyl groups, being particularly well-established. Typical representatives of such hydrophobizing silanes are n-octyl-triethoxysilane and also 1,4,4-trimethylpentyltriethoxysilane.

A distinction here may be made fundamentally between two forms of application. In the case of the first, a preexisting structure, such as a concrete bridge, a house frontage or a roofing shingle, is hydrophobized retrospectively with a coating formulation. The coating material applied in this case, at least with porous building materials, is able to penetrate the substrate as well and hence to develop at least a certain depth effect. In contrast to varnishes or paints which are applied solely superficially, therefore, relatively minor surface damage does not automatically result in a loss of the hydrophobic protective effect. With materials impregnated solely superficially, however, more serious damage, or else drilled holes or cut, sawn or fractured edges do lead to a loss of the protective effect at the areas affected.

Whereas a retrospective superficial hydrophobization is usually the only practicable impregnation method for preexisting structures, the hydrophobizing agent can be added even before the setting operation when producing components based on hydraulic binders, such as concrete or fiber cement, for example. An advantage of this hydrophobization in the mass is that in this way the entire volume of the component, and not merely its surface, is provided with water-repellent protection. The protective effect is therefore not lost if the component becomes damaged or else is deliberately sawn or provided with drilled holes. As a result of hydrophobization in the mass, moreover, a saving is made of the additional operational step of retrospectively coating the cured component.

A position of particular importance among the construction elements to be hydrophobized is occupied by fiber-reinforced cement composite materials.

For the production of these materials, a highly diluted slurry of fibers and cement, usually common Portland cement, is generally first dewatered to form films about 0.3 mm in thickness, which are then wound to a roll of the particular desired thickness. Thereafter the rolled-up fiber cement layer is cut open and flattened to form a planar slab, which can then be cut into the particular desired shape and size. Curing may take place over several days (typically 1-2 weeks) in air or else much more rapidly at elevated temperatures by autoclaving. With the latter process, 40-60% of sand can also be added to the fiber cement, and at the elevated autoclave temperatures reacts with the excess of lime in the cement to form calcium silicate hydrates.

Fibers used are primarily asbestos, cellulose, polyvinyl acetate (PVA), polyvinyl alcohol (PVOH) or polypropylene (PP) fibers. However, carbon fibers and polyacrylonitrile fibers may also be used. In terms of their properties, asbestos fibers in particular have a number of advantages, since not only are they strong and stiff but as inorganic materials they are also able to bond strongly to the cement matrix. In contrast, for example, to cellulose fibers, asbestos fibers are also rotproof.

In light of the risk to health arising from asbestos, however, this fiber material is in retreat, particularly in western industrial nations; in Europe and North America, the relevant products have already disappeared completely.

Alternatives used which are unobjectionable in health terms, in the case of non-autoclaved cement fiber slabs, are usually combinations of cellulose fibers with PVA, PVOH, PP or PET fibers. Since PVA, PP and also PET are destroyed by the autoclaving step, that process generally uses only cellulose as an alternative to the asbestos. However, because fiber cement slabs without PVA, PP, PET and asbestos possess only moderate mechanical properties, autoclaved products are used principally, in Europe and America, for the facing of frontages, whereas non-autoclaved products are used usually for load-bearing wall or roofing elements.

For exterior applications in particular, hydrophobized fiber cement slabs are increasingly being employed; because of the advantages described above, a trend is apparent away from the retrospective coating and toward the mass hydrophobization.

The mass hydrophobization of fiber cement components with formulations whose constituents include alkoxysilanes having a hydrophobic alkyl group has been known for a long time and was described back in 1991 in DE 411449.

One of the disadvantages of using alkoxysilanes, however, is the large amount of alcohol which is liberated in use from the silanes by the hydrolysis of their alkoxysilyl groups. In the case of the aforementioned alkyltriethoxysilanes whose alkyl groups contains 8 carbon atoms, the amount by weight of ethanol liberated corresponds almost exactly to 50% of the amount of silane used.

This poses a major problem particularly for the mass hydrophobization of fiber cement, since there, as described, a highly diluted slurry of fibers and cement is dewatered. In order to avoid excessive quantities of waste water, the process water removed in the dewatering is generally returned to the process. Where a silane is used for the mass hydrophobization, the highly water-soluble alcohol that is liberated remains in the process water and therefore accumulates progressively with each cycle of the water returned to the process; its removal would necessarily entail processes which are technically very complex and in reality are barely practicable for reasons of cost.

It has been found, moreover, that monomeric alkylalkoxysilanes, when used for mass hydrophobization, exhibit only a moderately good effect.

As an improvement, as described by WO 2019/141377, in architectural preservation, particularly in connection with the mass hydrophobization of fiber cement, a proposal has been made to use not monomeric alkylalkoxysilanes but instead corresponding oligomeric alkylalkoxysilane resins. This has resulted in a decisive improvement.

WO 2019/141377 also describes a process for producing these resins, in which, in a continuous operation, a corresponding monomeric alkyltrichlorosilane is reacted with a mixture of water and alcohol to give the oligomeric alkyl silicone resin. This operation produces extremely large quantities of biproduct hydrogen chloride. While this process can be very cost-effective, it is able to develop that advantage only if implemented in a very specific plant, as described in WO 2019/141377. If this plant is not available, then this operation is complicated and therefore of low economic profitability simply because of the extremely large quantities of hydrogen chloride which are liberated and, ideally, should be recycled. Likewise complicated and therefore expensive as well are the secure transportation and reliable handling of the required alkyltrichlorosilane reactant, which can liberate hydrogen chloride spontaneously on contact with air.

Desirable here would be a simple and rapid operation, starting from substantially less critical monomeric alkylalkoxysilanes, which are oligomerized to the corresponding resins through a reaction with a suitable amount of water. The problem with this chemical approach, however, is that production of the desired hydrophobic alkyl silicone resins requires alkylalkoxysilanes that are likewise hydrophobic. Logically, these hydrophobic alkylalkoxysilanes are not miscible with water. The corresponding reaction therefore has to take place in a two-phase system, which always results in long reaction times, since chemical reactions can take place only at the phase boundaries. This on the one hand is a considerable detriment to the space-time yield, and on the other hand may also have an adverse effect on product quality, because long reaction times at elevated temperatures can result not only in secondary reactions but also in unwanted discoloration. And, of course, the desire is also for an operation in which the product is obtained directly in sufficiently good quality without further purification.

An object of the invention, therefore, was to provide a process for producing a hydrophobic alkyl silicone resin (A) that no longer has the disadvantages and restrictions affecting the processes described in the prior art.

BRIEF SUMMARY

Embodiments of a process for producing alkyl silicone resins (A) are provided. In an embodiment, the alkyl silicone resins (A) contain at least 80 wt % of units of the general formula (I)

$$R^1_a(R^2O)_b(HO)_dR^3_cSiO_{(4-a-b-c-d)/2},$$ (I)

where
$R^1$ may be identical or different and is a monovalent, SiC-bonded, unsubstituted or substituted aliphatic hydrocarbon radical having not more than 4 carbon atoms,
$R^2$ may be identical or different and is hydrogen or a monovalent, unsubstituted or substituted hydrocarbon radical having not more than 4 carbon atoms,
$R^3$ may be identical or different and is a monovalent, SiC-bonded, unsubstituted or substituted hydrocarbon radical having at least 5 carbon atoms,
a is 0, 1, 2 or 3,
b is 0, 1, 2 or 3 and
c is 0, 1 or 2, with the proviso that the sum of a+b+c is less than or equal to 3 and in at least 50% of the units of the general formula (I) the sum of a+b is 0 or 1 and in at least 40% of the units of the general formula (I) c is 1,
d is 0 or 1, and
where the amount of alkoxy groups $R^2O$ is 3-20 wt %.

4

In a first reaction step (R1), alkylalkoxysilane (A1) of the general formula (II)

$$R^1_aR^3_cSi(OR^2)_{(4-a-c)},$$ (II)

where $R^1$, $R^2$, $R^3$, a and c have the definitions stated above,
is mixed alternatively with a pure acid(S) having $pK_a$ of not more than 5, with an at least 5 wt % aqueous solution of an acid(S) having a $pK_a$ of not more than 5, or with a halosilane compound (A2) of the general formula (III)

$$R^1_aR^3_cSi(X)_{(4-a-c)},$$ (III)

where X is a halogen atom and $R^1$, $R^3$, a and c have the definitions stated above. Subsequently, in at least one further reaction step (R2), water is added.

DETAILED DESCRIPTION

A subject of the invention is a process for producing alkyl silicone resins (A) containing at least 80 wt % of units of the general formula (I)

$$R^1_a(R^2O)_b(HO)_dR^3_cSiO_{(4-a-b-c-d)/2},$$ (I)

where
$R^1$ may be identical or different and is a monovalent, SiC-bonded, unsubstituted or substituted aliphatic hydrocarbon radical having not more than 4 carbon atoms,
$R^2$ may be identical or different and is hydrogen or a monovalent, unsubstituted or substituted hydrocarbon radical having not more than 4 carbon atoms,
$R^3$ may be identical or different and is a monovalent, SiC-bonded, unsubstituted or substituted hydrocarbon radical having at least 5 carbon atoms,
a is 0, 1, 2 or 3,
b is 0, 1, 2 or 3 and
c is 0, 1 or 2, with the proviso that the sum of a+b+c is less than or equal to 3 and in at least 50% of the units of the general formula (I) the sum of a+b is 0 or 1 and in at least 40% of the units of the general formula (I) c is 1,
d is 0 or 1, and
where the amount of alkoxy groups $R^2O$ is 3-20 wt %,
where alkylalkoxysilane (A1) of the general formula (II)

$$R^1_aR^3_cSi(OR^2)_{(4-a-c)},$$ (II)

where $R^1$, $R^2$, $R^3$, a and c have the definitions stated above, is mixed in a first reaction step (R1) alternatively with a pure acid (S) having $pK_a$ of not more than 5, with an at least 5 wt % aqueous solution of an acid (S) having a pK$_a$ of not more than 5 or with a halosilane compound (A2) of the general formula (III)

$$R^1{}_aR^3{}_cSi(X)_{(4-a-c)}, \qquad (III)$$

where X is a halogen atom and R$^1$, R$^3$, a and c have the definitions stated above, and subsequently in at least one further reaction step (R2) water is added.

The halosilane compound (A2) optionally used liberates hydrogen halides spontaneously on contact with water, and its effect is therefore similar to that of the direct addition of the corresponding hydrohalic acid.

The pK$_a$ as a measure of the strength of acid is familiar to the skilled person; a suitable definition is found in "Grundlagen der allgemeinen and anorganischen Chemie", Hans-Rudolf Christen, 9th edition, 1988, section 10.3.

Preference is given to using a halosilane compound (A2) or an acid (S) having a pK$_a$ of not more than 3, more preferably a halosilane compound (A2) or phosphoric, phosphonic, sulfonic, sulfuric or hydrohalic acid, especially preferably a halosilane compound (A2) or a hydrohalic acid. A preferred hydrohalic acid is hydrochloric acid.

The halosilane compound (A2) or the acid (S) is used preferably in an amount of 0.01 g to 100 g, more preferably in an amount of 0.1 g to 25 g, especially preferably in an amount of 0.2 g to 10 g, based in each case on 1000 g of alkoxysilane (A1). Where the acid (S), as is preferred, is used as an aqueous solution, these quantities are based on the pure acid (S) which is present in the aqueous solution.

Where an acid (S) is used, it is used preferably in the form of an aqueous solution having an acid concentration of at least 10 wt %, more preferably in an acid concentration of at least 15 wt %, and especially preferably in an acid concentration of at least 20 wt %.

In one preferred version a halosilane compound (A2) or an at least 5 wt, more preferably an at least 10 wt, especially preferably an at least 20 wt % aqueous hydrochloric acid is used in an amount of 0.1 g to 25 g, preferably of 0.2 g to 10 g, based on 1000 g of alkoxysilane (A1), the quantity being based on the halosilane compound (A2) or on the pure hydrochloric acid that is present in the aqueous acid solution.

In one preferred embodiment it is part of reaction step (R1) that the reaction mixture, after the addition of the halosilane compound (A2), the pure acid (S) or the aqueous solution of the acid (S), is stirred or otherwise uniformly mixed until the halosilane compound (A2), the pure acid (S) or the aqueous solution of the acid (S) has dissolved completely in the reaction mixture and the latter is clear.

Reaction step (R1) is carried out preferably at temperatures between 0° C. and 100° C., more preferably at temperatures between 10° C. and 100° C., more particularly between 20° C. and 90° C.

In one preferred embodiment the addition of water in reaction step (R2) is carried out at a slow rate such that the reaction mixture remains clear throughout the addition of water and there is no clouding apparent.

In one preferred embodiment it is part of reaction step (R2), that the reaction mixture is uniformly mixed, more particularly stirred, after the end of the addition of water for a further 1 min to 10 h, more preferably for 5 min to 5 h, especially preferably for 15 min to 3 h, in order to achieve a complete reaction between the added water and the silane (A1).

Reaction step (R2) is carried out preferably at temperatures between 0° C. and 100° C., more preferably at temperatures between 20° C. and 100° C., especially preferably between 40° C. and 90° C.

The invention is based on the surprising finding that when deploying the process of the invention it is possible to conduct the reaction between the alkylalkoxysilane (A1) and water, referred to as the silane hydrolysis, entirely or at least in large parts in a single-phase reaction mixture in spite of the hydrophobicity of the silane (A1) used. The single-phase nature of the mixture is evident from the fact that at the end of reaction step (R1) the reaction mixture is clear and remains clear during the addition of water in the second reaction step (R2). Under these circumstances, the reaction proceeds very quickly, as evident not least from a marked exothermic heating of the reaction mixture during the addition of water.

If, conversely, the acid (S) used as catalyst and the water are added not, in accordance with the invention, in succession, but instead together in the form of an in this case more highly diluted acid solution, to the alkoxysilane (A1), the result is the two-phase reaction mixture actually anticipated. In this case the reaction mixture remains cloudy until the added water has been almost completely consumed by reaction, at the end of reaction. On the basis of this 2-phase character, reaction times of >10 h are required even if stirring is very intense. Exothermic heating of the reaction mixture is not observable, owing to the very slow progress of reaction.

The same actually anticipatable result is achieved if first water and alkoxysilane (A1) are mixed and the reaction is subsequently initiated by addition of a catalytic amount of acid. Under these conditions as well, the reaction mixture remains two-phase and cloudy, there is no exothermic heating observable, and the same long reaction times are required.

Finally, the same, relatively unadvantageous reaction profile is also found when a mixture of water and the acidic catalyst is introduced and the alkoxysilane (A1) is metered into this mixture.

The type of catalyst, lastly, is also of critical importance. Hence normally bases as well are perfect and therefore established catalysts for silane hydrolysis and condensation. If in the case of the reaction of the invention, however, a basic catalyst is used rather than the acid, the reaction mixture, independently of the specific procedure, exhibits the actually anticipatable behavior and remains two-phase and cloudy until the water added has undergone almost complete consumption by reaction at the end of reaction. Under these conditions as well, very long reaction times are necessary, and no exothermic heating of the reaction mixture is observable because of the slow process of reaction. It is notable that with basic catalysis, in contrast to the acidic catalysis of the invention, even the addition sequence and reaction regime of the invention do not produce any better result.

Preference for radical R$^1$ is given to unsubstituted radicals, i.e. the alkyl radicals, such as the methyl, ethyl, n-propyl, isopropyl, 1-n-butyl, 2-n-butyl, isobutyl and tert-butyl, where methyl and ethyl radicals are particularly preferred and the methyl radical is especially preferred.

Examples of radical R$^2$ are the definitions indicated for radical R1. Radical R2 preferably comprises alkyl radicals optionally substituted by halogen atoms and having 1 to 4 carbon atoms, more particularly the methyl and ethyl radical.

Radical $R^3$ preferably comprises unsubstituted cyclic, branched or unbranched alkyl groups having 6 to 18 carbon atoms. Examples of radical R3 are n-hexyl, cyclohexyl, n-octyl, 1,4,4-trimethylpentyl, decyl, dodecyl, tetradecyl, hexadecyl or octadecyl radicals.

Radicals $R^3$ more preferably comprise alkyl groups having 8 to 16 carbon atoms, more particularly n-octyl, 1,4,4-trimethylpentyl or n-hexadecyl radicals.

The alkyl silicone resins (A) contain preferably at least 90 wt % of units of the general formula (I). More preferably component (A) consists exclusively of units of the general formula (I).

In the alkyl silicone resins (A) preferably at least 90 mol % of all radicals $R^1$ are methyl radical. In the alkyl silicone resins (A) preferably at least 90 mol % of all radicals $R^2$ are methyl, ethyl, propyl or isopropyl radical. In the alkyl silicone resins (A) preferably at least 90 mol % of all radicals $R^3$ are unsubstituted alkyl groups having 8 to 16 carbon atoms.

In the alkyl silicone resins (A), in each case independently of one another, a is preferably 0 or 1, b is preferably 0, 1 or 2, c is preferably 0 or 1, and d is preferably 0. Preferred alkyl silicone resins (A) are those having at least 40%, more preferably at least 60%, of units of the general formula (I) in which a is 0 and c is 1, based in each case on the total number of units of the general formula (I). In one particular embodiment of the invention the alkyl silicone resins (A) have exclusively units of the formula (I) in which a is 0 and c is 1.

One version of the invention uses alkyl silicone resins (A) which, based in each case on the total number of units of the general formula (I), have at most 50%, more preferably at most 40%, very preferably at most 20% of units of the general formula (I) in which a has the value 2.

Preferred alkyl silicone resins (A) are those which, based in each case on the total number of units of the general formula (I), have 8 to 65%, more particularly 10 to 45%, very particularly 12 to 16% of units of the general formula (I) in which b has the value 0.

Preferred alkyl silicone resins (A) are those which, based in each case on the total number of units of the general formula (I), have 30 to 70%, more particularly 45 to 63% of units of the general formula (I) in which b has the value 1.

Preferred alkyl silicone resins (A) are those which, based in each case on the total number of units of the general formula (I), have 5 to 45%, more particularly 22 to 40%, units of the general formula (I) in which b has the value 2.

Preferred alkyl silicone resins (A) are those which, based in each case on the total number of units of the general formula (I), have 0 to 5%, more preferably 0 to 2%, more particularly 0 to 1% of units of the general formula (I) in which b has the value 3.

Preferred alkyl silicone resins (A) are those which, based in each case on the total number of units of the general formula (I), have at least 80%, more preferably at least 90%, more particularly at least 95% of units of the formula (I) in which d is 0.

Examples of the alkyl silicone resins (A) are organopolysiloxane resins which consist to an extent of at least 95%, preferably exclusively, of (Q) units of the formulae $SiO_{4/2}$, $Si(OR^4)O_{3/2}$, $Si(OR^4)_2O_{2/2}$ and $Si(OR^4)_3O_{1/2}$, (T) units of the formulae $Alk-SiO_{3/2}$, $Alk-Si(OR^4)O_{2/2}$ and $Alk-Si(OR^4)_2O_{1/2}$, $Me-SiO_{3/2}$, $Me-Si(OR^4)O_{2/2}$ and $Me-Si(OR^4)_2O_{1/2}$, (D) units for the formulae $Me_2SiO_{2/2}$ and $Me_2Si(OR^4)O_{1/2}$, and (M) units for the formula $Me_3SiO_{1/2}$, where Me is a methyl radical, Alk is an unsubstituted alkyl radical having 8 to 16 carbon atoms, and R4 is alkyl radicals having 1 to 4 carbon atoms, the resin containing preferably 0-2 mol of (Q) units, 0-2 mol of (D) units and 0-2 mol of (M) units per mol of (T) units.

Preferred examples of the alkyl silicone resins (A) are organopolysiloxane resins which consist of at least 95%, preferably exclusively, of T units of the formulae $AlkSiO_{3/2}$, $AlkSi(OR^4)O_{2/2}$ and $AlkSi(OR^4)_2O_{1/2}$ and also T units of the formulae $MeSiO_{3/2}$, $MeSi(OR^4)O_{2/2}$ and $MeSi(OR^4)_2O_{1/2}$ and also D units of the formulae $Me_2SiO_{2/2}$ and $Me_2Si(OR^4)O_{1/2}$, where Me, Alk and R4 have the definition stated above, and the molar ratios of (T) to (D) units are between 1.0 to 10.0.

Further preferred examples of the alkyl silicone resins (A) are organopolysiloxane resins which consist to an extent of at least 95%, preferably exclusively, of T units of the formulae $AlkSiO_{3/2}$, $AlkSi(OR^4)O_{2/2}$ and $AlkSi(OR^4)_2O_{1/2}$ and also T units of the formulae $MeSiO_{3/2}$, $MeSi(OR^4)O_{2/2}$ and $MeSi(OR^4)_2O_{1/2}$, where Me, Alk and R4 have the definition stated above, having a molar ratio of Alk to Me units of 0.5 to 4.0.

Additional preferred examples of the alkyl silicone resins (A) are organopolysiloxane resins which extend to an extent of at least 95%, preferably exclusively, of T units of the formulae $AlkSiO_{3/2}$, $AlkSi(OR^4)O_{2/2}$ and $AlkSi(OR^4)_2O_{1/2}$, where Alk and R4 have the definition stated above.

Especially preferred examples of the alkyl silicone resins (A) are organopolysiloxane resins which have one of the composition described in the preceding four paragraphs, where Alk is n-octyl, 1,4,4-trimethylpentyl or n-hexadecyl radicals, more particularly n-octyl or 1,4,4-trimethylpentyl radicals.

The alkyl silicone resins (A) preferably possess a mean molar mass (numerical mean) $M_n$ of at least 400 g/mol and more preferably of at least 600 g/mol. The mean molar mass $M_n$ is preferably at most 400 000 g/mol, more preferably at most 10 000 g/mol, more particularly at most 1 500 g/mol.

The molar mass is determined by GPC. Instrument Iso Pump Agilent 1200,

Autosampler Agilent 1200, column oven Agilent 1260, detector RID Agilent 1200, column Agilent 300×7.5 mm OligoPore cut-off 4500D, column material highly cross-linked polystyrene/divinylbenzene, 25 eluent toluene, flow rate 0.7 ml/min, injection volume 10 µl, concentration 1 g/l (in toluene), PDMS (polydimethylsiloxane) calibration (Mp 28 500 D, Mp 25 200 D, Mp 10 500 D, Mp 5100 D, Mp 4160 D, Mp 1110 D, Mp 311 D).

At 23° C. and 1000 hPa the alkyl silicone resins (A) may be either be solid or liquid, and the alkyl silicone resins (A) are preferably liquid. The silicone resins (A) preferably possess a viscosity of 10 to 100 000 mPas, preferably of 50 to 1 000 mPas, more particularly of 100 to 500 mPas.

In the context of the present invention, the viscosity is determined after conditioning to 23° C. with a DV 3 P rotational viscometer from A. Paar (Brookfieldsystem), using spindle 5 at 2.5 rpm in accordance with ISO 2555.

In the first reaction step (R1) it is possible to use pure alkylalkoxysilanes (A1) or else two or more alkoxysilanes (A1) of the general formula (II).

In one preferred embodiment of the process of the invention, reaction steps (R1) and (R2) of the invention are followed by a further reaction step (R3) in which a base (B) is added in an amount greater than the amount of base (B) that would be needed in order to fully neutralize the amount of acid (S) present in the reaction mixture at the moment of addition of the base (B) or the amount of hydrogen halide liberated from the halosilane compound (A2) and present at that moment.

The base (B) here preferably has a $pK_b$ of not more than 5 and more preferably a $pK_b$ of not more than 3.6. With a special preference the base (B) is an alkali metal or alkaline earth metal hydroxide or carbonate, with the use of an alkali metal hydroxide, such as sodium hydroxide and potassium hydroxide, being especially advantageous.

Likewise used preferably as base (B) is an alkali metal alkoxide, more preferably sodium alkoxide and potassium alkoxide, more particularly sodium ethoxide and potassium methoxide.

The $pK_b$ as a measure of the strength of a base is known to the skilled person; a suitable definition is found in "Grundlagen der allgemeinen and anorganischen Chemie", Hans-Rudolf Christen, $9^{th}$ edition, 1988, section 10.3.

The base (B) may be added in pure form or in the form of an aqueous or alcoholic solution. Where the base (B) is a solid, it is added preferably in the form of aqueous solution. In particular the alkali metal alkoxides are used as alcoholic solutions. Where the base (B) is used in the form of an aqueous or alcoholic solution, a preferred concentration of the base (B) in this solution is at least 5 wt %, with a concentration of at least 10 wt % being particularly preferred and a concentration of at least 15 wt % being especially preferred. The respective upper concentration limits are dictated by the maximum solubility of the base (B).

In one preferred embodiment it is part of reaction step (R3) that the reaction mixture after the end of the addition of the base (B) is stirred, or otherwise uniformly mixed together, for a period of 1 min to 20 h, more preferably for 5 min to h, especially preferably for 15 min to 3 h, after the end of the addition of the base (B).

At the end of reaction step (R3), the reaction mixture preferably has a pH of at least 6.0, more preferably at least 6.5 and especially preferably at least 7.

The reaction step (R3) is carried out preferably at temperatures between 0° C. and 100° C., more preferably at temperatures between 20° C. and 100° C., especially preferably between 40° C. and 90° C.

This preferred embodiment derives from a further surprising finding, whereby the reaction between the silane (A1) and water, referred to as the silane hydrolysis, can indeed be carried out in a single-phase reaction mixture and therefore particularly well with the acidic catalysis of the invention, but that under acidic conditions a comparatively large number of the silanol functions (Si—OH groups) formed as a result of the silane hydrolysis are not condensed or condense only very slowly.

This is a disadvantage since in this way a relatively high fraction of silanol functions remain in the end product (A). During storage, these silanol groups may react slowly with the alkoxy groups of the resin (A) of the invention to form Si—O—Si ridges and liberate alcohol $R^2OH$. Since the latter in general is highly flammable, this reduces the flash point of the resultant, now alcohol-contaminated resin (A).

This is generally a grave problem for the end user of the alkyl silicone resins (A), usually a manufacturer of cementitious products such as fiber cement slags, who is not equipped to operate with flammable substances.

The pH in reaction step (R3) here need not necessarily be greater than 7—all that is critical is that the amount of the base (B) is greater than the amount that would be needed in order to neutralize the amount of acid still present at the time of addition of the base (B) in the reaction mixture, with the exception of the likewise acidic silanol groups.

The base (B) added in excess reacts with some of the Si—OH groups present in the reaction mixture, and so the reaction mixture is ultimately located in the pH range of a silanol-silanolate buffer system. Surprisingly, however, it has been found that even under these conditions, i.e., even at pH levels of well below 7, the silanolate groups which are present undergo rapid condensation with the alkoxysilyl groups ($R^2O$—Si groups) present in the resin (A) and possibly also with the silanol groups likewise present, to form Si—O—Si bridges. In other words, even under the conditions of a silanol-silanolate buffer system, i.e., at pH levels below 7, there is a rapid breakdown of the silanol groups still present.

In many cases, therefore, another phenomenon that occurs is that the reaction mixture directly after the addition of the base (B) still has a pH of well below 6, possibly even well below 5, which then, however, rises of itself, that is even without addition of further base (B), to a level of greater than 6.0, preferably 6.5 and more particularly of at least 7 at the end of reaction step (R3). This occurs usually within 1 up to a maximum of 60 min, usually within from 1 to a maximum of min.

In one particularly preferred embodiment (AF1), reaction step (R3) is carried out by adding the base (B) to the reaction mixture, on conclusion of reaction steps (R1) and (R2), in an amount greater than the amount that would be needed in order to fully neutralize the acid (S) used in reaction step (R1) or the hydrogen halide liberated from the halosilane compound (A2) used in reaction step 1.

The alcohol $R^2OH$ liberated during the process of the invention is preferably removed distillatively in a further process step (R4).

The distillation is carried out preferably at a liquid-phase temperature of 60° C. to 150° C. and more preferably of 70° C. to 120° C.

The distillation is carried out preferably at a pressure of 0.01 mbar to ambient pressure, more preferably at least partly at a reduced pressure of 0.1 mbar to 100 mbar and especially preferably at least partly at a pressure of 1 mbar to 50 mbar.

The alkyl silicone resin (A) prepared preferably has an alcohol content of not more than 2 wt %, more preferably of not more than 1 wt % and especially preferably of not more than 0.5 wt %.

Where the particularly preferred embodiment (AF1) of the inventive process is carried out, the entire amount of alcohol liberated is preferably distilled off after the end of reaction step (R3). In this way only a single distillation step is needed in order to attain the preferred low alcohol contents stated above in the alkyl silicone resin (A).

It is of course conceivable to insert a distillation step as early as after the end of process step (R2). Doing so, however, has the disadvantage either that the alcohol ($R^2OH$) liberated in process step (R3) is not removed, or else a further distillation step is necessary after the reaction step (R3). In embodiment (AF1), therefore, this procedure is not preferred.

It is also possible to conceive of the distillative removal of a part of the resultant alcohol ($R^2OH$) as early as during process step (R2). Since, however, in that case as yet unreacted water may also be distilled off, it is difficult under these conditions to regulate with sufficient accuracy the amount of water remaining in the reaction mixture and therefore the resultant degree of oligomerization of the alkyl silicone resin (A). For this reason as well this procedure is not preferred in embodiment (AF1).

Where the particularly preferred embodiment (AF1) of the inventive process is carried out, the pH obtained at the end of process step (R3) may be adjusted in a further process step (R5) by addition of an acid or base into a largely neutral range, more preferably a pH of 6.5 to 7.5. This is especially preferred when in process step (R3) the amount of base used has been large enough for the reaction mixture obtained to have a pH>7.5. Process step (R5) in this case may be carried out both before and after the distillation (R4).

Where the preferred embodiment (AF1) of the inventive process is carried out, the salt obtained as a result of the addition of base in process step (R3) and also where appropriate the salt obtained as a result of the neutralization (R5) are removed preferably by a filtration step (R6). The filtration step (R6) in this case may take place both after and before the distillation step (R4) and/or the neutralization (R5). The filtration is preferably the last process step.

The filtration (R6) may optionally be carried out with assistance of a filter aid. Filter aids are chemically inert substances which support a filtration physico-mechanically. Filter aids are used in order to be able to clean the actual filter or filter insert more easily or in order to prevent solids from the suspension clogging the filter or getting into the filtrate. Here is it possible to use all established filter aids. Examples of filter aids frequently used are cellulose, silica gel, kieselguhr or perlite.

In a further particularly preferred embodiment (AF2), the reaction step (R3) is carried out by using in reaction step (R1) a halosilane compound (A2) or a hydrohalic acid, the special preference being given to aqueous hydrochloric acid having an acid concentration of at least 5 wt % or to a chlorosilane compound (A2), i.e., a compound of the formula (III) in which X is a chlorine atom, during or preferably after the end of reaction step (R2), distillatively removing at least 30%, preferably at least 60%, more preferably at least 80%, especially preferably at least 90% of the amount of alcohol ($R^2OH$) liberated in the preceding reaction steps, in one reaction step, where at least some of, preferably a major part of, the hydrogen halide present in the reaction mixture is distilled off as well, and subsequently adding the base (B) in an amount greater than the amount that would be needed in order to fully neutralize the amount of hydrohalic acid remaining in the reaction mixture.

The distillative removal of the alcohol ($R^2OH$) and of the hydrohalic acid is carried out preferably such that less than 1000 ppm, more preferably less than 500 ppm, of hydrohalic acid remain in the reaction mixture. This is particularly simple to achieve if the hydrohalic acid is hydrochloric acid, i.e., if in reaction step 1 hydrochloric acid or a chlorosilane (A2) is used and the distillation is carried out such that the resultant reaction mixture contains less than 5 wt %, preferably less than 1 wt %, of alcohol ($R^2OH$).

The distillation is carried out preferably at a liquid-phase temperature of 60° C. to 150° C. and more preferably of 70° C. to 120° C.

The distillation is carried out preferably at a pressure of 0.01 mbar to ambient pressure, more preferably at least partly at a reduced pressure of 0.1 mbar to 100 mbar and especially preferably at least partly at a pressure of 1 mbar to 50 mbar.

In the case of the preferred embodiment (AF2) as well, after the end of process step (R3) in a further distillation step (R4), all of the alcohol $R^2OH$ still present in the reaction mixture is removed distillatively. This is preferable even when, in the preceding joint distillative removal of alcohol and acid, the very low alcohol content preferred according to the invention has been achieved, since more alcohol ($R^2OH$) is formed during process step (R3) as a result of the condensation reactions that take place during that process step.

This distillation (R4) is carried out exactly as set out above, to give a product (A) having the preferred and particularly preferred low alcohol contents stated above.

In the case of the particularly preferred embodiment (AF2) as well, a neutralizing step (R5) and/or a filtration step (R6) may be carried out. The procedure for these steps may be the same as described for the embodiment (AF1). The sequence of the various process steps (R4), (R5) and (R6) may also be varied as desired as in the case of the preferred embodiment (AF2).

Preferably, however, in the case of the particularly preferred embodiment (AF2), the process steps (R5) and (R6) are omitted. It is generally possible to omit process step (R5), since in process step (R3) only a very small amount of base has to be added, and so with suitable implementation of the process, even without an additional neutralizing step, success is achieved in obtaining an end product (A) which, owing to the above-described silanol-silanolate buffer, has a pH of between 6.5 and 7.5. And process step (R6) can generally be omitted because the amount of salt formed in process step (R3) is extremely small and therefore is no longer disruptive in the application.

The alkyl silicone resins (A) prepared in accordance with the invention are used in particular for the mass hydrophobizing of fiber cement. This use, the various forms of use and also the advantages resulting from this use are described in detail in WO 2019/141377 beginning at page 15, line 21 to page 20, line 27 and also in the examples. The corresponding passage and also the examples from WO 2019/141377 are therefore considered part of the disclosure content of the present patent specification.

In the examples described below, all viscosity figures are based on a temperature of 23° C. Unless otherwise indicated, the examples below are carried out at the pressure of the surrounding atmosphere, in other words approximately at 1000 hPa, and at room temperature, in other words at approximately 23° C., or at a temperature which is about when the reactants are combined at room temperature without additional heating or cooling, and also at a relative humidity of approximately 50%. Furthermore, all parts and percentages are given by weight unless otherwise indicated.

EXAMPLES

Inventive Example 1: Inventive Procedure of Particularly Preferred Embodiment (AF1)

Apparatus:

The reaction is carried out in a 1000 ml three-neck flask with heating facility (oil bath with magnetic stirrer), KPG stirrer, dropping funnel and reflux condenser.

Chemicals Used in Reaction Steps (R1) to (R3):

| | |
|---|---|
| 600.0 g | of 1,4,4-trimethylpentyltriethoxysilane (2.17 mol) |
| 2.5 g | of 25 wt % aqueous hydrochloric acid (0.017 mol HCl, 0.104 mol $H_2O$) |
| 40.6 g | of water (2.26 mol) |
| 3.0 g | of 50 wt % aqueous sodium hydroxide solution (0.038 mol NaOH, 0.083 mol $H_2O$) |

Procedure 600.0 g of 1,4,4-trimethylpentyltriethoxysilane are introduced and heated to 65° C. At this temperature 2.5 g of 25% aqueous HCl are metered in with intense stirring at a uniform rate over the course of 20 min, with the reaction mixture initially undergoing slight clouding (2-phase system). Stirring is continued at 65° C. for 10 min, with the reaction mixture becoming clear again.

Thereafter, with the temperature unchanged, 40.6 g of water are metered in over the course of 30 min. A perceptibly exothermic reaction begins, and raises the reaction temperature to ~70° C. To limit the temperature to 70° C., the reaction mixture is cooled after this temperature has been reached. The reaction mixture remains clear the entire time. After the end of metering, stirring is continued at 65° C. for 60 min.

Thereafter, with the temperature unchanged, a ph of ~9-10 is established by addition of a 50% aqueous sodium hydroxide solution (3.0 g). Sodium chloride is precipitated as a white solid, but the reaction mixture remains a single phase. It is subsequently stirred for 30 min still at 65° C.

It is cooled to room temperature and neutralized by addition of 25% HCl (2.1 g) to pH 7. Stirring is continued for 30 min, during which the pH may rise again. In that case, the pH must be established again at 7 by addition of small amounts of acid.

After the reflux condenser has been replaced with a Claisen condenser with short column (around 1-2 plates), the low boilers are distilled off at an oil bath temperature of 120° C. and atmospheric pressure until further distillate is no longer produced. The liquid-phase temperature here rises continuously to 110° C. ~225 g of distillate are obtained in this operation. Thereafter the pressure is reduced to 10 mbar, producing a further ~5 g of distillate. After ~15 min, no further distillate is produced even at this pressure, and the pressure is reduced to 5 mbar. Under these conditions, even very small residues of ethanol and/or water are removed from the reaction mixture for a further 30 min.

406 g of residue in the form of a colorless liquid are obtained, containing the sodium chloride formed as a white solid.

Filtration:

g of Seitz EF filter aid are added to the material to be filtered (around 2.5 wt %) and distributed homogeneously by stirring.

Following the homogenization of the filter aid, the suspension at room temperature is placed into a pressure suction filter on K100 filter material, and the filter is closed and subjected to compressed air (around 5 bar).

After a short time, the filtrate begins to run off into the corresponding collection vessel. It is clear from the start. The compressed air feed is continued until there is no longer any run-off.

Thereafter the compressed air is switched off, the pressure suction filter is depressurized, and only then is the filter opened for cleaning.

Characterization of the End Product (Alkyl Silicone Resin (A)):

The end product is a clear liquid having a viscosity, measured by the method indicated in the description, of 185 mPas.

The end product is analyzed by means of $^1$H and $^{29}$Si-NMR distribution, with determinations of the amount of ethoxy groups, the distribution of the Si units over the various condensation stages, the amount of the silanol groups remaining in the product, and the amount of free ethanol remaining in the product. The result obtained in this case is as follows:

| | |
|---|---|
| Ethoxy content: | 13.4 wt % (based on the total weight of the end product) |
| Silanol content: | 94 ppm (calculated as $O_{1/2}H$ (molar weight = 9), based on the total weight of the end product) |
| Ethanol content: | 0.03 wt % (based on the total weight of the end product) |

Distribution of the Si units over the various condensation stages:

| | |
|---|---|
| Si(OEt)$_3$ units: | 0.8 mol % (monomeric silane) |
| Si(OEt)$_2$O$_{1/2}$ units: | 16.2 mol % |
| Si(OEt)O$_{2/2}$ units: | 55.6 mol % |
| SiO$_{3/2}$ units: | 27.4 mol % |

Inventive Example 2: Inventive Procedure of Particularly Preferred Embodiment (AF1)

The procedure is just the same as in inventive example 1, with the sole difference that instead of 600.0 g of 1,4,4-trimethylpentyltriethoxysilane, the same amount of n-octyl-triethoxysilane is used. The course of the reaction proved to be exactly the same.

Characterization of the End Product (Alkyl Silicone Resin (A)):

The end product is a clear liquid having a viscosity, measured by the method indicated in the description, of 223 mPas.

The end product is analyzed by means of $^1$H and $^{29}$Si-NMR distribution, with determinations of the amount of ethoxy groups, the distribution of the Si units over the various condensation stages, the amount of the silanol groups remaining in the product, and the amount of free ethanol remaining in the product. The result obtained in this case is as follows:

| | |
|---|---|
| Ethoxy content: | 13.8 wt % (based on the total weight of the end product) |
| Silanol content: | 35 ppm (calculated as $O_{1/2}H$ (molar weight = 9), based on the total weight of the end product) |
| Ethanol content: | 0.10 wt % (based on the total weight of the end product) |

Distribution of the Si units over the various condensation stages:

| | |
|---|---|
| Si(OEt)$_3$ units: | 1.0 mol % (monomeric silane) |
| Si(OEt)$_2$O$_{1/2}$ units: | 18.3 mol % |
| Si(OEt)O$_{2/2}$ units: | 50.3 mol % |
| SiO$_{3/2}$ units: | 30.4 mol % |

Inventive Example 3: Inventive Procedure of Particularly Preferred Embodiment (AF1)

The procedure is just as in inventive example 1, with the following differences:

instead of 2.5 g of a 25 wt % aqueous hydrochloric acid, reaction step (R1) uses 2.0 g (0.008 mol) of 1,4,4-trimethylpentyltrichlorosilane as catalyst. In a reaction with water, this silane liberates 0.024 mmol of hydrogen chloride.

instead of 3.0 g of a 50 wt % aqueous sodium hydroxide solution, reaction step (R3) uses 4.7 g of a sodium methoxide solution in methanol (0.026 mol $NaOCH_3$).

A neutralizing step (R5) is omitted, since following the addition of sodium methoxide in reaction step (R3) the reaction mixture already has a pH of 7.

The reaction regime otherwise and also the course of the reaction were exactly identical as described for inventive example 1.

Characterization of the End Product (Alkyl Silicone Resin (A)):

The end product is a clear liquid having a viscosity, measured by the method indicated in the description, of 175 mPas.

The end product is analyzed by means of $^1H$ and $^{29}Si$-NMR distribution, with determinations of the amount of ethoxy groups, the distribution of the Si units over the various condensation stages, the amount of the silanol groups remaining in the product, and the amount of free ethanol remaining in the product. The result obtained in this case is as follows:

| | |
|---|---|
| Ethoxy content: | 13.1 wt % (based on the total weight of the end product) |
| Methoxy content: | 0.3 wt % (based on the total weight of the end product) |
| Silanol content: | 174 ppm (calculated as $O_{1/2}H$ (molar weight = 9), based on the total weight of the end product) |
| Ethanol content: | 0.05 wt % (based on the total weight of the end product) |

Distribution of the Si units over the various condensation stages:

| | |
|---|---|
| $Si(OR)_3$ units: | 0.9 mol % (monomeric silane) |
| $Si(OR)_2O_{1/2}$ units: | 18.1 mol % |
| $Si(OR)O_{2/2}$ units: | 55.8 mol % |
| $SiO_{3/2}$ units: | 25.2 mol % | where R = ethyl or methyl radical.

Comparative Example 1: Non-Inventive Procedure Reaction (Joint Addition of Acid (S) and Water)

The same apparatus, the same formulation and the same chemicals in the same amounts as in inventive example 1 are used. However, before the start of the reaction, the hydrochloric acid and the water are mixed together and metered jointly into the trimethylpentyltriethoxysilane over the course of 30 min at a reaction temperature of 65° C. with intense stirring. The reaction mixture becomes cloudy directly after the start of the addition. No heating of the reaction mixture is apparent. It is stirred at 65° C. for 6 h, with the reaction mixture acquiring a slight brownish discoloration.

Thereafter the reaction is terminated and the reaction mixture is cooled to room temperature and left to stand overnight.

After this, around 50 ml of a clear upper phase have separated, whereas the lower phase, which continues to have brownish discoloration, is still cloudy. An analysis of the two phases by $^1H$ analysis shows that the upper phase consists essentially of ethanol and monomeric silane, whereas the lower phase consists of monomeric silane and the oligomeric target product in a molar ratio of around 1:1 and also of small amounts of ethanol. The reaction is therefore a long way off from a complete conversion. The reaction mixture was thereupon discarded.

Comparative Example 2: Non-Inventive Procedure Reaction (Addition of Acid (S) and Water in Reverse Order)

The same apparatus, the same formulation and the same chemicals in the same amounts as in inventive example 1 are used. Here, however, first the water and the trimethylpentyltriethoxysilane are mixed with intense stirring, with the resulting mixture turning cloudy. It is then heated to 65° C. and at this temperature over the course of 20 min the 25% hydrochloric acid is metered in with intense stirring. No heating of the reaction mixture is apparent. It is stirred at 65° C. for 6 h, with the reaction mixture acquiring a slight brownish discoloration.

Thereafter the reaction is terminated and the reaction mixture is cooled to room temperature and left to stand overnight.

On the next day, the result evident is essentially the same as for comparative example 1.

Comparative Example 3: Non-Inventive Procedure Reaction (Use of a Basic Rather than an Acidic Catalyst)

The apparatus used is the same as in inventive example 1. Chemicals Used in Reaction Steps (R1) and (R2):

| | |
|---|---|
| 600.0 g | of 1,4,4-trimethylpentyltriethoxysilane (2.17 mol) |
| 3.1 g | of 30 wt % sodium methoxide solution in methanol (0.017 mol $NaOCH_3$) |
| 42.5 g | of water (2.36 mol) |

Procedure 600.0 g of 1,4,4-trimethylpentyltriethoxysilane are introduced and heated to 65° C. At this temperature, 3.1 g of 30 wt % sodium methoxide solution in methanol are metered in with intense stirring over the course of 20 min at a uniform rate. The reaction mixture here remains clear, but after just 5 min from the beginning of the addition it begins to take on a brown coloration. Stirring is continued for 10 min at 65° C. after the end of the addition, with the brown coloration becoming more intense.

Thereafter, with the temperature unchanged, 42.5 g of water are metered in over the course of 30 min. Directly after the start of the metering there is a distinct clouding of the reaction mixture. A very slight exothermic reaction begins, which raises the reaction temperature by 2-4° C. to 67-69° C. There is no need for cooling of the reaction mixture. After the end of metering, the earlier dark-brown and still cloudy reaction mixture is stirred for a further 5 h at 65° C.

Thereafter the reaction is terminated and the reaction mixture is cooled to room temperature and left to stand overnight.

After this, around 200 ml of an upper phase with slight brownish discoloration have separated, whereas the lower phase, with intense brown discoloration, is still cloudy. An analysis of the two phases by $^1H$ analysis shows that the upper phase consists essentially of ethanol and monomeric silane, whereas the lower phase consists of monomeric silane and the oligomeric target product in a molar ratio of around 1:2 and also of small amounts of ethanol. The reaction mixture was thereupon discarded.

Comparative Example 4: Non-Inventive Procedure Reaction (Use of a Basic Rather than an Acidic Catalyst)

The procedure is as in comparative example 3, with the use, instead of 3.1 g of wt % sodium methoxide solution (0.017 mol NaOCH₃) in methanol, of 9.0 g (0.059 mol) of DBU (1,8-diazabicyclo[5.4.0]undec-7-ene) as basic catalyst.

Here as well, the reaction mixture remains clear during the addition of catalyst. There is no discoloration. With the commencement of addition of water, however, there is an immediate clouding of the reaction mixture in this case as well. There is, though, no discoloration. No exothermic heating of the reaction mixture can be observed.

After the termination of the reaction, after the end of the 5-hour subsequent stirring time, the reaction mixture is still cloudy. Overnight only a very small amount of an upper phase separates off. A ¹H analysis of the still cloudy lower reaction phase shows that significantly more than half of the alkoxysilane used is still present unchanged. The batch was thereupon discarded.

Inventive Example 4: Inventive Procedure of Particularly Preferred Embodiment (AF2)

The apparatus used is the same as in inventive example 1. Chemicals Used in Reaction Steps (R1) and (R2):

| | |
|---|---|
| 600.0 g | of 1,4,4-trimethylpentyltriethoxysilane (2.17 mol) |
| 2.5 g | of 25 wt % aqueous hydrochloric acid (0.017 mol HCl, 0.104 mol H₂O) |
| 46.0 g | of water (2.56 mol) |

Procedure 600.0 g of 1,4,4-trimethylpentyltriethoxysilane are introduced and heated to 65° C. At this temperature 1.3 g of 25% aqueous HCl are metered in with intense stirring over the course of 20 min at a uniform rate, with the reaction mixture initially becoming slightly cloudy (2-phase system). Stirring is continued for 10 min at 65° C., with the reaction mixture becoming clear again.

Thereafter, with the temperature unchanged, 42.0 g of water are metered in over the course of 30 min. A perceptibly exothermic reaction begins, and raises the reaction temperature to ~70° C. In order to limit the temperature to 70° C., the reaction mixture is cooled after this temperature has been attained. The reaction mixture remains clear for the whole time. After the end of metering, stirring is continued for 60 min at 65° C.

Following replacement of the reflux condenser with a Claisen condenser with short column (around 1-2 plates), the low boilers are distilled off at an oil bath temperature of 120° C. and atmospheric pressure until no further distillate is produced. The liquid-phase temperature here rises continuously to 110° C. In this case ~220 g of distillate are obtained. Thereafter the pressure is reduced to 10 mbar, with a further ~4 g of distillate being obtained. The reaction mixture obtained contains a chloride content of 43 ppm.

Thereafter the mixture is cooled to 65° C., and at this temperature 0.25 g of 50% aqueous sodium hydroxide solution (0.003 mol) is added, with the reaction mixture, which up to this point has been glass-clear, becoming slightly opaque. Directly after the addition of base, the reaction mixture has a pH of 4, which rises to ~6 after stirring of 5 minutes and to 7 after stirring for 10 minutes. The reaction mixture is stirred in total after the addition of base for a further 45 min at 65° C.

Thereafter the low boilers are removed at an oil bath temperature of 120° C. and a pressure of 5 mbar, producing ~5 g of distillate. After ~30 min no further distillate is obtained, and the distillation is ended.

403 g of residue in the form of a colorless liquid are obtained. The product exhibits a very slight clouding, but even after 14-day storage no perceptible amount of solid settles out.

Characterization of the End Product (Alkyl Silicone Resin (A)):

The end product is a clear liquid having a viscosity, measured by the method indicated in the description, of 238 mPas.

The end product is analyzed by means of ¹H and ²⁹Si-NMR distribution, with determinations of the amount of ethoxy groups, the distribution of the Si units over the various condensation stages, the amount of the silanol groups remaining in the product, and the amount of free ethanol remaining in the product. The result obtained in this case is as follows:

| | |
|---|---|
| Ethoxy content: | 13.1 wt % (based on the total weight of the end product) |
| Silanol content: | 338 ppm (calculated as O₁/₂H (molar weight = 9), based on the total weight of the end product) |
| Ethanol content: | 0.11 wt % (based on the total weight of the end product) |

Distribution of the Si units over the various condensation stages:

| | |
|---|---|
| Si(OEt)₃ units: | 0.7 mol % (monomeric silane) |
| Si(OEt)₂O₁/₂ units: | 15.1 mol % |
| Si(OEt)O₂/₂ units: | 54.4 mol % |
| SiO₃/₂ units: | 29.8 mol % |

Inventive Example 5: Inventive Though not Preferred Procedure of the Process of the Invention The procedure is just the same as in inventive example 1, with the only differences that the addition of sodium hydroxide (reaction step (R3)) and also the neutralization of the end product (reaction step (R5)) are omitted. The procedure and course of all remaining reaction steps are exactly as described in inventive example 1.

Characterization of the End Product (Alkyl Silicone Resin (A)):

The end product is a clear liquid having a viscosity, measured by the method indicated in the description, of 125 mPas.

The end product is analyzed by means of ¹H and ²⁹Si-NMR distribution, with determinations of the amount of ethoxy groups, the amount of the silanol groups remaining in the product, and the amount of free ethanol remaining in the product. The result obtained in this case is as follows:

| | |
|---|---|
| Ethoxy content: | 14.3 wt % (based on the total weight of the end product) |
| Silanol content: | 11.800 ppm (calculated as O₁/₂H (molar weight = 9), based on the total weight of the end product) |

-continued

| Ethanol content: | 0.21 wt % (based on the total weight of the end product) |
|---|---|

The invention claimed is:

1. A process for producing alkyl silicone resins (A) containing at least 80 wt % of units of the general formula (I)

$$R^1{}_a(R^2O)_b(HO)_dR^3{}_cSiO_{(4-a-b-c-d)/2},$$ (I)

where $R^1$ may be identical or different and is a monovalent, SiC-bonded, unsubstituted or substituted aliphatic hydrocarbon radical having not more than 4 carbon atoms, $R^2$ may be identical or different and is hydrogen or a monovalent, unsubstituted or substituted hydrocarbon radical having not more than 4 carbon atoms, $R^3$ may be identical or different and is a monovalent, SiC-bonded, unsubstituted or substituted hydrocarbon radical having at least 5 carbon atoms, a is 0, 1, 2 or 3, b is 0, 1, 2 or 3 and c is 0, 1 or 2, with the proviso that the sum of a+b+c is less than or equal to 3 and in at least 50% of the units of the general formula (I) the sum of a+b is 0 or 1 and in at least 40% of the units of the general formula (I) c is 1, d is 0 or 1, and where the amount of alkoxy groups $R^2O$ is 3-20 wt %, where alkylalkoxysilane (A1) of the general formula (II)

$$R^1{}_aR^3{}_cSi(OR^2)_{(4-a-c)},$$ (II)

where $R^1$, $R^2$, $R^3$, a and c have the definitions stated above, is mixed in a first reaction step (R1) with one of the following: a pure acid (S) having $pK_a$ of not more than 5, an at least 5 wt % aqueous solution of an acid (S) having a $pK_a$ of not more than 5 or a halosilane compound (A2) of the general formula (III)

$$R^1{}_aR^3{}_cSi(X)_{(4-a-c)},$$ (III)

where X is a halogen atom and $R^1$, $R^3$, a and c have the definitions stated above, and subsequently in at least one further reaction step (R2) water is added, wherein the mixing in the first reaction step (R1) results in a clear, single-phase reaction mixture, and wherein the reaction mixture remains clear during the addition of water in the reaction step (R2).

2. The process as claimed in claim 1, wherein $R^1$ is selected from methyl and ethyl radical.

3. The process as claimed claim 1, wherein $R^2$ is selected from methyl and ethyl radical.

4. The process as claimed in claim 1, wherein at least 90 mol % of all the radicals $R^3$ are an alkyl group having 8 to 16 carbon atoms.

5. The process as claimed in claim 1, wherein the alkyl silicone resins (A) have at least 40% units of the general formula (I) in which a is 0 and c is 1, based in each case on the total number of units of the general formula (I).

6. The process as claimed in claim 1, wherein reaction steps (R1) and (R2) are followed by a further reaction step (R3) in which a base (B) is added in an amount greater than the amount of base (B) that would be needed in order to fully neutralize the amount of acid (S) present in the reaction mixture at the moment of addition of the base (B) or the amount of hydrogen halide liberated from the halosilane compound (A2) and present at that moment.

7. The process as claimed in claim 6, wherein the base (B) is selected from alkali metal or alkaline earth metal hydroxide or carbonate and alkali metal alkoxide.

8. The process as claimed in claim 1, wherein the alcohol $R^2OH$ liberated during the process is partially or completely removed distillatively in a further process step (R4).

9. The process as claimed in claim 6, wherein reaction step (R3) is carried out by adding the base (B) to the reaction mixture, on conclusion of reaction steps (R1) and (R2), in an amount greater than the amount that would be needed in order to fully neutralize the acid (S) used in reaction step (R1) or the hydrogen halide liberated from the halosilane compound (A2) used in reaction step 1.

10. The process as claimed in claim 9, wherein the salt obtained by the addition of base in process step (R3) and also, optionally, in one or more further neutralization steps (R5) as well is removed by a filtration step (R6).

11. The process as claimed in claim 6, wherein, in reaction step (R1), a halosilane compound (A2) or a hydrohalic acid is used, during or on conclusion of reaction step (R2) at least 30% of the amount of alcohol ($R^2OH$) liberated in the preceding reaction steps is removed distillatively, with the hydrogen halide present in the reaction mixture being distilled off as well at least partially, and subsequently in process step (R3) the base (B) is added in an amount greater than the amount that would be needed in order to fully neutralize the amount of hydrohalic acid remaining in the reaction mixture.

12. The process as claimed in claim 11, wherein, during or on conclusion of reaction step (R2), at least 60% of the amount of alcohol ($R^2OH$) liberated in the preceding reaction steps is removed distillatively.

13. The process as claimed in claim 11, wherein the alcohol $R^2OH$ still present in the reaction mixture after process step (R3) is partially or completely removed in a further distillation step (R4).

14. The process as claimed in claim 11, wherein the halosilane compound (A2) is a chlorosilane compound and, in reaction step (R1), an aqueous hydrochloric acid having an acid concentration of at least 5 wt % or the chlorosilane compound (A2), i.e., a compound of the formula (III), in which X is a chlorine atom, is used.

15. The process as claimed in claim 1, wherein the alkyl silicone resin (A) produced has an alcohol content of not more than 2 wt %.

* * * * *